United States Patent [19]
Prince et al.

[11] Patent Number: 5,862,667
[45] Date of Patent: Jan. 26, 1999

[54] TURBINE FUEL STRAINER

[75] Inventors: Brian K. Prince; Robert D. Byerley, both of Riverside; Svjatoslav Ingistov, Los Angeles, all of Calif.

[73] Assignee: Atlantic Richfield Company, Los Angeles, Calif.

[21] Appl. No.: 544,139

[22] Filed: Oct. 17, 1995

[51] Int. Cl.[6] .................................................. F02C 1/00
[52] U.S. Cl. ...................................... 60/734; 210/448
[58] Field of Search .................... 60/39.092, 734; 210/172, 445, 446, 448, 450, 452, 497.01

[56] References Cited

U.S. PATENT DOCUMENTS

| | | | |
|---|---|---|---|
| 1,630,287 | 5/1927 | Amdursky | 210/452 |
| 3,592,768 | 7/1971 | Parker | 210/445 |
| 5,203,174 | 4/1993 | Meyer | 60/734 |

FOREIGN PATENT DOCUMENTS

| | | | |
|---|---|---|---|
| 85532 | 7/1981 | Japan | 60/734 |

*Primary Examiner*—Charles G. Freay
*Attorney, Agent, or Firm*—Kyle L. Elliott

[57] ABSTRACT

A fuel strainer for use in a turbine that filters debris out of fuel feed lines of the turbine to prevent clogging of flame nozzles in the turbine. The strainer comprises an elongated straining member with a plurality of apertures therethrough. The sum of the cross-sectional areas of the apertures is significantly greater than the cross-sectional area of the fuel feed line, and each individual aperture is smaller than all of the fuel holes in the flame nozzles.

6 Claims, 2 Drawing Sheets

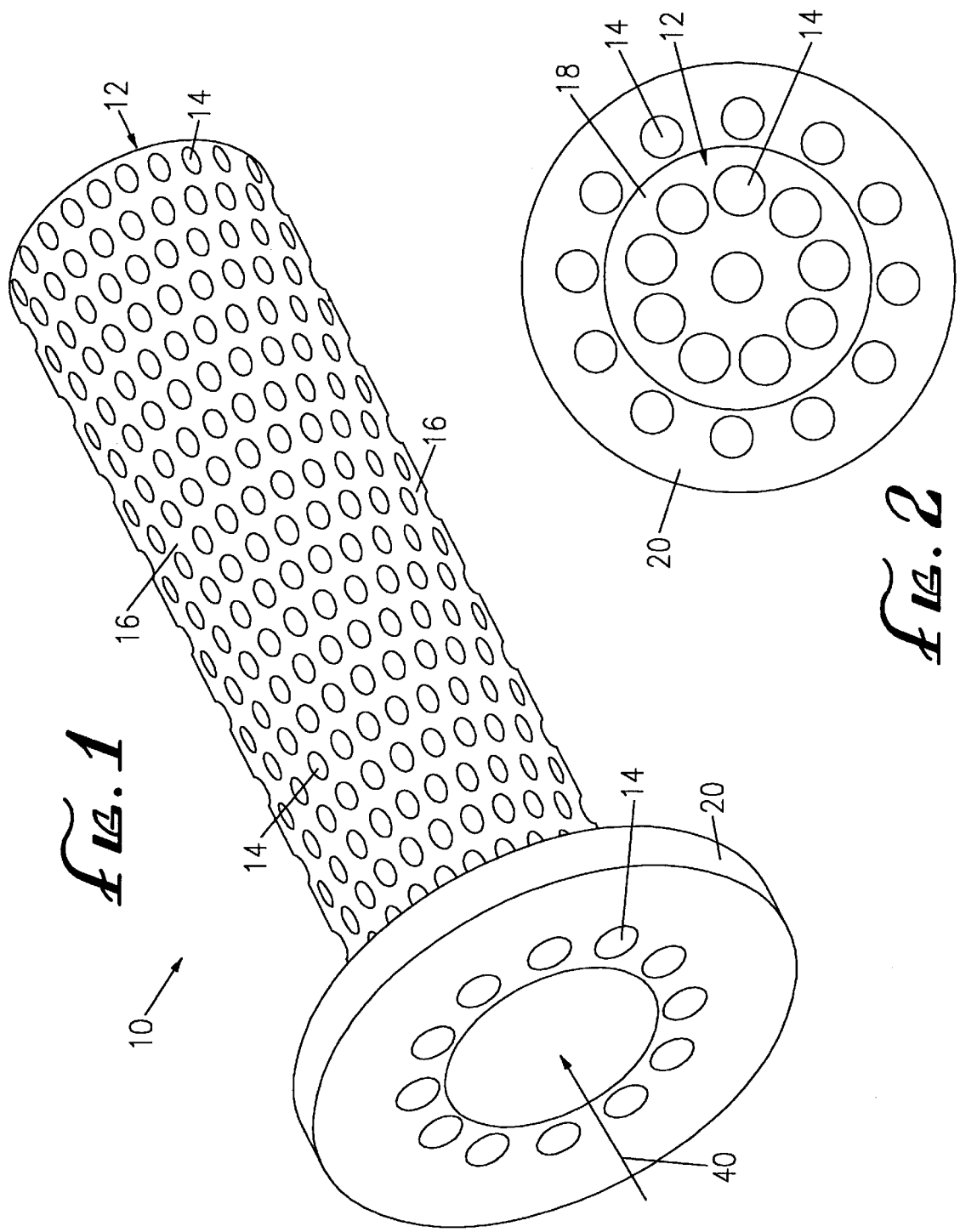

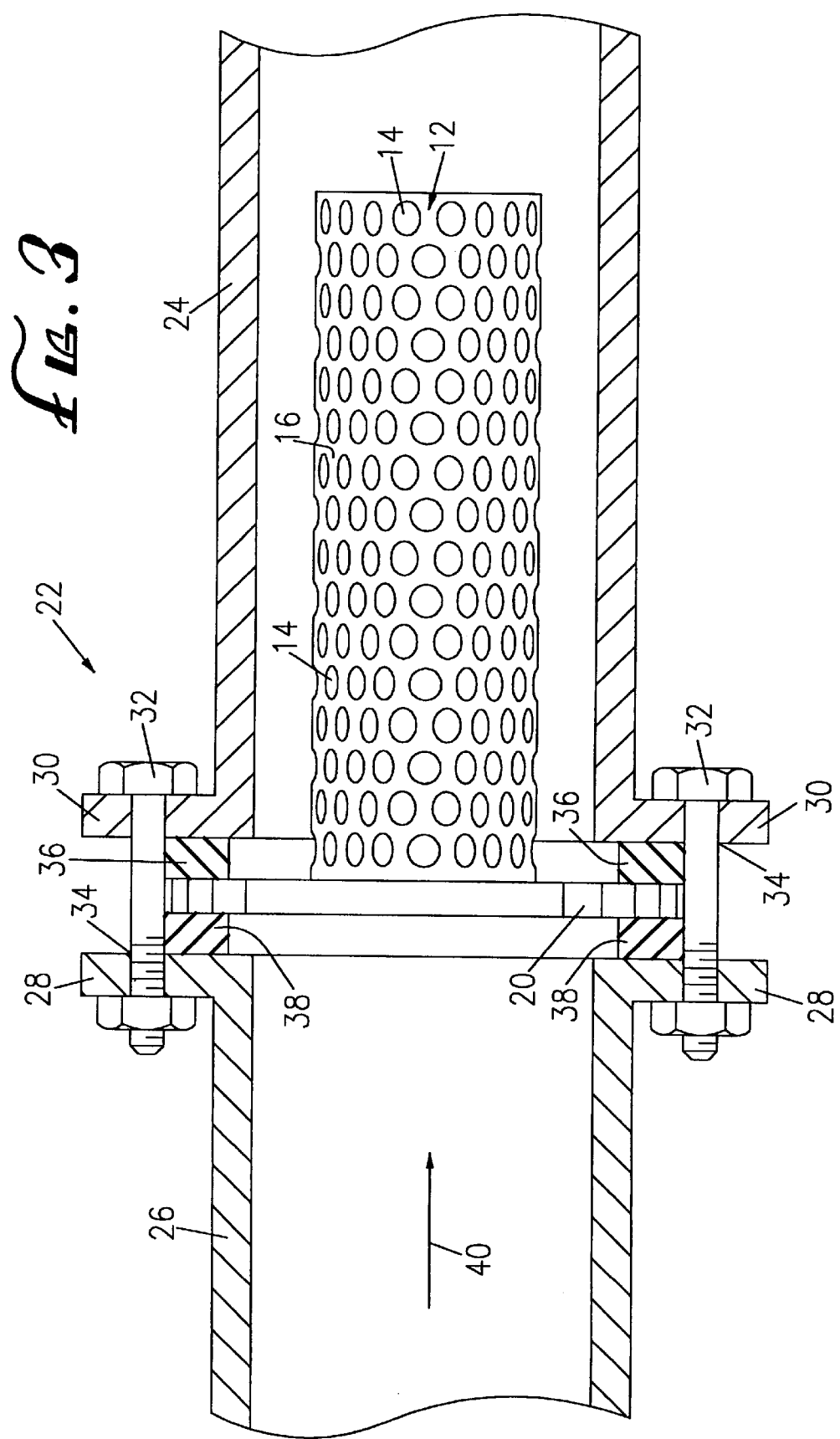

TURBINE FUEL STRAINER

BACKGROUND OF THE INVENTION

This invention relates to combustion gas turbines and the fuel supply systems therefor.

Since the end of World War II, combustion gas turbines have been utilized in many industrial applications and have taken a prominent position as energy producers. For example, turbines are utilized in conjunction with oil refineries to burn waste and by-product gases from the refinery as fuel for the turbine to produce electricity which can be used or sold to an electric company and steam which is utilized by the oil refinery. A facility which produces steam for use by an oil refinery and electricity for use and sale is commonly referred to as a cogeneration plant.

A typical turbine used at a cogeneration plant and in other applications, takes in air which is compressed and forced into a combustion chamber inside the turbine. The gases produced at the oil refinery flow through fuel lines to nozzles in the combustion chambers where the fuel is combusted thereby heating the air and increasing the pressure in the combustion chamber. The products of combustion are allowed to expand inside stationary and rotating turbine blades in the turbine to impart torque to the turbine shaft which is connected to the rotating turbine blades. The rotation of the turbine shaft is utilized in many ways including, for example, to power a generator to produce electricity and to power an air compressor as a combustion air source.

In a typical turbine, there are ten flame nozzles spaced around the circumference of the turbine and each flame nozzle comprises an outer ring nozzle and an inner ring nozzle. The inner ring nozzle is supplied with butane and the outer ring nozzle is supplied with natural gas, refinery waste, or a mixture of the two. Each has a plurality of fuel holes through which the respective gas is passed. It is important that all the fuel holes remain open so that the shape of the flame emanating from the flame nozzle is uniform and the amount of fuel being burned and turbine power can be controlled. Though not unique to cogeneration plants, it is frequently the case that the fuel gas produced by the oil refinery is contaminated with debris such as scale and coke. Frequently, the debris is large enough to clog the holes in the natural gas nozzle. This restricts the flow of gas through the nozzle and deforms the flame shape creating temperature differences across the turbine which can lead to equipment damage and cause the turbine to perform inefficiently, shut down, or otherwise malfunction.

Extra maintenance above and beyond the manufacturer's recommended routine maintenance is required when the frequency with which the fuel holes become clogged with debris is increased. The extra maintenance, equipment damage, inefficient performance, shut downs, and other malfunctions all increase the cost of running the turbine. Further cost is added to the operation of the turbine by clogged flame nozzles because the nozzles must be sent off site to a qualified repair facility, usually the manufacturer, for cleaning and repair. It is desirable, therefore, to prevent debris from clogging the fuel holes.

BRIEF SUMMARY OF THE INVENTION

In accordance with the present invention, there is provided a fuel strainer for use in a turbine for filtering turbine fuel feed lines terminating in a flame nozzle which has a plurality of fuel holes. The fuel strainer comprises, a straining member and a mounting flange. The straining member has a plurality of apertures through it whereby fuel is allowed to flow through the straining member and debris is captured by the straining member.

In a preferred embodiment, the straining member has a cylindrical wall and a substantially planar end wall forming a basket shape. The sum of the areas of the apertures is greater than the cross-sectional area of the fuel feed line, and the area of each individual area is smaller than the area of the fuel holes. Thus, the flow of fuel is not impeded, and any debris which would clog the fuel holes is captured by the straining member.

In another embodiment of the invention, there is provided a fuel inlet line or pipe for feeding fuel to a turbine having a plurality of flame nozzles. The fuel inlet line has an up stream member connected to a down stream member with a down stream end of the downstream member in communication with the flame nozzle. The fuel strainer is sealed between the up stream member and the down stream member and the flow of fuel is directed toward the down stream member so that it passes through the fuel strainer.

In a preferred embodiment of the fuel inlet pipe, the fuel strainer is centrally located in the pipe, and the fuel strainer extends into the passage way of the down stream member whereby fuel flows through the strainer and debris is caught inside the strainer. To hold the fuel strainer centrally in the pipe, a circumferential mounting flange extends from the strainer, and the fasteners which connect the up stream member to the down stream member engage the edge of the mounting flange around the circumference of the mounting flange thereby centering the fuel strainer in the pipe.

These and other features and advantages of the present invention will appear from the following Detailed Description and the accompanying drawings in which similar reference characters denote similar elements throughout the several views.

BRIEF DESCRIPTION OF THE DRAWINGS

FIG. 1 is a perspective view of a fuel strainer;

FIG. 2 is an end view of the fuel strainer of FIG. 1; and

FIG. 3 is a view in partial cross-section of a fuel feed line for a turbine utilizing the fuel strainer of FIG. 1.

DETAILED DESCRIPTION

Turning in detail to the drawings, FIGS. 1 and 2 show an embodiment of a fuel strainer, generally designated 10, according to the present invention. The fuel strainer comprises a straining member 12 with a plurality of apertures 14 therethrough. The straining member has an elongated section 16 and an end section 18. The elongated section comprises a cylindrical wall and the end section comprises a substantially planar end wall. Thus, in the preferred embodiment shown, the straining member is the shape of a basket. Both the cylindrical wall and end wall have apertures therethrough. The fuel strainer is interposed in the fuel line with a mounting flange 20 which is connected to the straining member. The mounting flange extends around the circumference of the straining member and is preferably located at an upstream end of the straining member. The portion of the mounting flange closest to the straining member can also have apertures 14.

Referring to FIG. 3, the mounting flange 20 is used to mount the fuel strainer in the fuel inlet pipe, generally designated 22. The pipe comprises a downstream tubular member 24 and an upstream tubular member 26. The downstream tubular member has a down stream end in communication with a flame nozzle (not shown). The upstream end of the downstream member is attached to the downstream end of the upstream member.

In the embodiment illustrated, the connection between the tubular members comprises a circumferential connection flange 28 extending from the downstream end of the up stream member, a circumferential connection flange 30 extending from the up stream end of the down stream, and a plurality of conventional fasteners 32 which are substantially equally spaced around the circumferences of the connection flanges. The fasteners, preferably bolts, extend through holes 34 in the connection flanges 28, 30. The fasteners are tightened to pull the connection flanges tight together. The mounting flange 20 of the fuel strainer is interposed between the connection flanges 28,30 of the tubular members. On either side of the mounting flange 20 is a downstream gasket 36 and an upstream gasket 38. The gaskets 36, 38 seal the connection to prevent the fuel from leaking out of the fuel line. The tubular members and their respective connection flanges are preferably circular in cross section, and the fasteners are positioned in the connection flanges at a constant radius from the center of the tubular members. The outer diameter of the gaskets and the fuel strainer mounting flange are sized so that their outer edges contact the fasteners. Because all of the fasteners are the same radius from center of the fuel feed line and because the outer edges of the gaskets and the fuel strainer mounting flange contact the fasteners, the gaskets and the fuel strainer are automatically centered in the fuel feed line.

The straining member or basket extends into the down stream tubular member so that the fuel, which flows in the direction of arrow 40, flows through the basket. That is, the fuel flows into the basket and out again through the apertures. Debris in the fuel also flows into the basket, and if the debris is too large to pass through the apertures 14, the debris will be caught inside the cylindrical wall of the basket.

To prevent an appreciable loss of pressure in the fuel line down stream from the fuel strainer, the apertures in the basket have a combined cross-sectional area at least as great as the cross-sectional area of the passage way through the tubular members. In the preferred embodiment, the sum of the cross-sectional areas of the apertures is greater than the cross-sectional area of the passage ways of the tubular members. Having the combined cross-sectional area of the apertures 14 substantially greater than the cross-sectional area of the pipe, allows the fuel strainer to catch a substantial amount of debris and become significantly clogged before there is any appreciable loss in pressure in the fuel line downstream from the fuel strainer. Further, the sum of the cross-sectional areas of the apertures is preferably twice as great as the sum of the cross-sectional areas of the fuel holes. Thus, the strainer can become 50% clogged without a loss of power in the turbine.

The outer diameter of the basket is smaller than the inside diameter of the downstream tubular member into which it extends, so that the flow of the fuel out of the apertures through the cylindrical wall of the basket is not restricted by the internal wall of the feed line. To prevent debris in the fuel from clogging the fuel holes in the flame nozzle, the largest aperture through the fuel strainer is at least as small as the smallest flame hole. Thus, any debris too large to pass through the fuel holes is retained inside the basket.

In a preferred embodiment, the apertures through the fuel strainer are smaller than the fuel holes. Though it is preferred for simplicity to have the apertures in the strainer the same size, the size of the apertures can be varied. Having apertures smaller than fuel holes compensates for the different shapes of debris. A specific piece of debris can be long and narrow, so that its smallest cross-sectional area is small enough to pass through the fuel holes. However, the remainder of the cross-sections have an area too great to pass through the fuel holes, and if the debris contacts the flame nozzle in an undesirable orientation, it will clog the nozzle. Therefore, straining out small debris particles by having the apertures smaller than the fuel holes, reduces the incidence with which debris will be oriented to pass through an aperture of the fuel strainer and be oriented differently, so that it clogs a flame hole of the nozzle.

The debris caught in the basket can, because of the continual flow of the fuel over it, eventually break up into pieces small enough to pass through the apertures in the basket. Because the apertures are smaller than the fuel holes, any debris which passes through the apertures will also pass through the larger fuel holes. Therefore, the fuel holes are not obstructed by any debris passing through the apertures.

The fuel strainer according to the present invention utilizes a basket-shaped straining member to strain debris from fuel to successfully prevent the debris from clogging the fuel holes in the flame nozzles without interfering with the operation of the turbine.

While various embodiments and applications of this invention have been shown and described, it is apparent to those skilled in the art that other modifications are possible without departing from the invention. For example, the shape of the straining member could be modified to conical, parabolic, elliptical, circular, or other shape. The shape of the end wall can be modified to a shape that is concave relative to the direction of the fuel flow to further increase the combined cross-sectional area of the apertures. It would also be possible to make the fuel strainer completely flat if the diameter of the tubular members were increased at the junction in which the fuel strainer is mounted. It is also possible to attach the fuel strainer mounting flange to a central portion of the straining member.

Further, it is possible to reverse the direction of the basket relative to the direction of fuel flow, so that the fuel flows over the basket not into it. The basket would extend into the upstream tubular member and debris to large to pass through the apertures would accumulate between the basket and the internal wall of the up stream tubular member instead of inside the basket. If the direction of the basket is reversed, an alternate shape of the basket, such as conical, may be advantageously utilized.

It is, therefore, to be understood that the scope of the invention should be limited only by the appended claims, wherein

What is claimed is:

1. A fuel strainer for a turbine fuel feed line having a passageway with a predetermined cross-sectional area and terminating in a flame nozzle having a plurality of fuel holes, the fuel strainer comprising:

a straining member having a plurality of apertures therethrough whereby fuel is allowed to flow through the strainer and debris is captured by the straining member;

wherein the sum of the cross-sectional areas of the apertures in the straining member comprises an area at least as great as the cross-sectional area of the fuel feed line.

2. A fuel strainer for a turbine fuel feed line having a passageway with a predetermined cross-sectional area and terminating in a flame nozzle having a plurality of fuel holes, the fuel strainer comprising:

a straining member having a plurality of apertures therethrough whereby fuel is allowed to flow through the strainer and debris is captured by the straining member; and a mounting flange attached to the straining member wherein a portion of the mounting flange extends into the passageway of the fuel line and the portion of the mounting flange extending into the passageway has apertures.

3. A fuel inlet pipe for feeding fuel to a turbine, said pipe having a plurality of flame nozzles and further comprising:

a downstream tubular member having a passageway therethrough;

an upstream tubular member having a passageway therethrough which is in communication with the passageway of the downstream tubular member;

means for connecting the upstream member to the downstream member; and a fuel strainer sealed between the upstream member and the downstream member;

wherein:

the flow of fuel is directed towards the downstream member and passes through the fuel strainer;

the fuel strainer includes a circumferential mounting flange;

the connection includes a first connection flange on the downstream member and a plurality of fasteners connecting the first connection flange to the second connection flange;

said fasteners engage the fuel strainer mounting flange around the circumference of the fuel strainer mounting flange; and the fuel strainer is centrally located in the pipe.

4. A fuel inlet pipe according to claim 3 wherein the first connection flange is circumferential and the second connection flange is circumferential.

5. A fuel inlet pipe according to claim 3 wherein the passage way of the down stream member has a cross-sectional area, and the fuel strainer comprises an elongated basket and an end wall, both the basket and the end wall having a plurality of apertures, each aperture having a cross-sectional area, and the sum of the cross-sectional areas of the apertures is at least as great as the cross-sectional area of the passage way of the down stream member.

6. A fuel inlet pipe according to claim 5 wherein the apertures are substantially equal spaced apart.

* * * * *